United States Patent
Ogihara

(10) Patent No.: US 8,327,554 B2
(45) Date of Patent: Dec. 11, 2012

(54) FORM MEASURING INSTRUMENT

(75) Inventor: Motonori Ogihara, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 20 days.

(21) Appl. No.: 13/176,404

(22) Filed: Jul. 5, 2011

(65) Prior Publication Data

US 2012/0005910 A1  Jan. 12, 2012

(30) Foreign Application Priority Data

Jul. 9, 2010 (JP) ................................ 2010-156561

(51) Int. Cl.
G01B 5/004 (2006.01)

(52) U.S. Cl. ........................................... 33/503

(58) Field of Classification Search ............... 33/503, 33/556
See application file for complete search history.

(56) References Cited

U.S. PATENT DOCUMENTS

| | | | | |
|---|---|---|---|---|
| 5,109,223 | A * | 4/1992 | Schmitt et al. ................. | 33/561 |
| 7,660,688 | B2 * | 2/2010 | Ishikawa et al. ............... | 33/503 |
| 2007/0205779 | A1 * | 9/2007 | Carli ............................ | 324/754 |
| 2007/0271803 | A1 * | 11/2007 | Ishikawa ...................... | 33/503 |
| 2009/0187373 | A1 * | 7/2009 | Atwell et al. .................. | 33/503 |
| 2012/0222324 | A1 * | 9/2012 | Raab et al. .................... | 33/503 |

FOREIGN PATENT DOCUMENTS

| | | |
|---|---|---|
| EP | 1 862 761 A1 | 5/2007 |
| EP | 2 023 076 A1 | 7/2008 |
| EP | 2 120 008 A2 | 11/2009 |
| JP | A-5-87501 | 4/1993 |
| JP | A-6-201366 | 7/1994 |
| JP | A-2002-528709 | 9/2002 |
| JP | A-2004-521343 | 7/2004 |

OTHER PUBLICATIONS

Oct. 10, 2011 Search Report issued in European Application No. 11005526.6.

* cited by examiner

Primary Examiner — G. Bradley Bennett
(74) Attorney, Agent, or Firm — Oliff & Berridge, PLC

(57) ABSTRACT

A form measuring instrument includes an instrument body and a controller that controls the instrument body. The instrument body includes a probe. The probe includes: a rod-like stylus having a distal end attached with a stylus tip for contacting with an object; and a support mechanism that supports the base end of the stylus. The support mechanism includes a probe sensor that detects the position of the stylus and supports the stylus in a manner movable within a predetermined range. The controller calculates a measurement value based on a transfer function whose input is the position of the stylus detected by the probe sensor and output is the contact position of the stylus tip against the object.

4 Claims, 5 Drawing Sheets

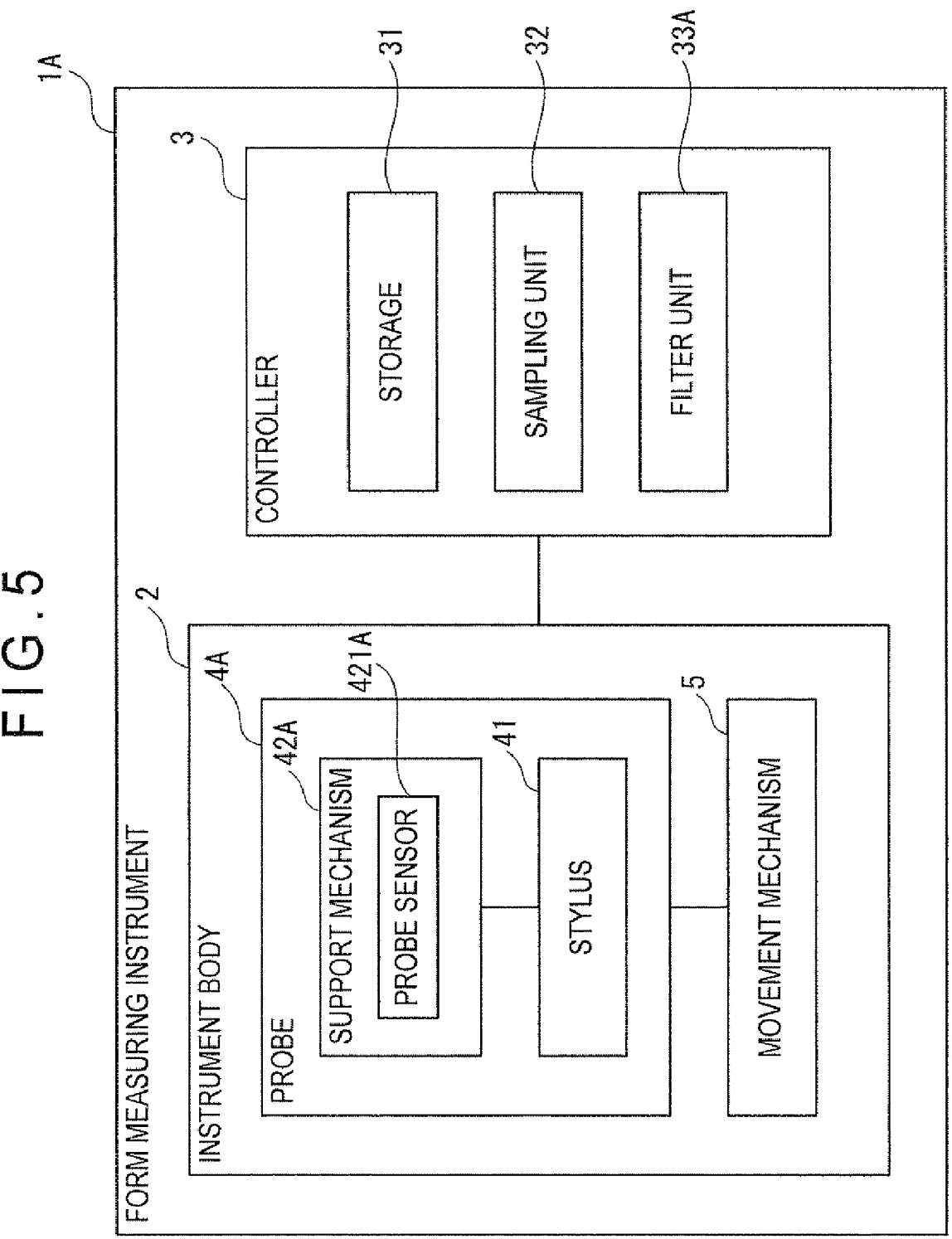

FORM MEASURING INSTRUMENT

The entire disclosure of Japanese Patent Application No. 2010-156561 filed Jul. 9, 2010 is expressly incorporated by reference herein.

BACKGROUND OF THE INVENTION

1. Field of the Invention

The present invention relates to a form measuring instrument.

2. Description of Related Art

A known form measuring instrument includes a probe that is movable within a predetermined range and is provided with a stylus tip designed to contact with an object, the stylus tip being brought into contact with the object to measure a profile of the object (see, for instance, Patent Literature 1: JP-T-2004-521343, Patent Literature 2: JP-A-5-87501 and Patent Literature 3: JP-A-6-201366).

A coordinates measuring machine (form measuring instrument) disclosed in Patent Literature 1 uses a probe calibration matrix for associating the position of the probe with a coordinate system of the coordinates measuring machine.

Coordinate measuring machines disclosed in Patent Literatures 2 and 3 perform compensation based on Hertzian elastic contact theory and a measuring force ratio to calculate a measurement value.

However, a form measuring instrument that uses an image represented by a matrix to calculate a measurement value (e.g., the coordinates measuring machine disclosed in Patent Literature 1) and a form measuring instrument that performs compensation based on a measuring force ratio to calculate a measurement value (e.g., the coordinates measuring machine disclosed in Patent Literature 2 or 3) do not take motion characteristics of a probe into consideration, so that these form measuring instruments cannot compensate a measurement error based on the motion history of the probe, such as a phase delay due to the motion characteristics of the probe.

SUMMARY OF THE INVENTION

An object of the invention is to provide a form measuring instrument capable of compensating a measurement error based on the motion history of a probe to increase measurement accuracy.

According to an aspect of the invention, a form measuring instrument includes: a probe that is movable within a predetermined range and is provided with a stylus tip for contacting with an object, the stylus tip being brought into contact with the object to measure a profile of the object; a detector that detects a position of the probe; and a measurement value calculator that calculates a measurement value based on a transfer function whose input is the position of the probe detected by the detector and output is a contact position of the stylus tip against the object.

According to the above arrangement, since the form measuring instrument includes the measurement value calculator that calculates a measurement value based on the transfer function whose input is the position of the probe and output is the contact position of the stylus tip against the object, a measurement error due to first- and higher-order terms in the transfer function used by the measurement value calculator. Thus, a measurement error based on the motion history of the probe can be compensated to improve measurement accuracy.

In the above aspect of the invention, it is preferable that the measurement value calculator includes: a sampling unit that samples the position of the probe detected by the detector; and a filter unit that calculates the measurement value by applying a digital filter based on the transfer function to the position of the probe sampled by the sampling unit.

According to the above arrangement, the form measuring instrument includes the sampling unit and the filter unit. Thus, without any additional hardware for providing the transfer function, the form measuring instrument can compensate a measurement error based on the motion history of the probe with a simple arrangement to improve measurement accuracy.

In the above aspect of the invention, it is preferable that the probe is movable in a plurality of axial directions, the transfer functions includes a plurality of transfer functions into which positions of the probe in the axial directions are respectively inputted and from which the contact position of the stylus tip against the object in one of the axial directions is outputted, and the measurement value calculator calculates the measurement value related to the one of the axial directions by summing up outputted values of the plurality of transfer functions.

According to the above arrangement, the measurement value related to one of the axial directions is calculated by summing up the outputted values of the transfer functions into which the positions of the probe in the axial directions are respectively inputted and from which the contact position of the stylus tip against the object in the one of the axial directions is outputted, so that a measurement error based on the motion history of the probe can be compensated in consideration of interference between the axial directions. Thus, measurement accuracy can be further improved.

BRIEF DESCRIPTION OF THE DRAWINGS

FIG. 5 is a block diagram showing a form measuring instrument according to a second exemplary embodiment of the invention.

DETAILED DESCRIPTION OF PREFERRED EMBODIMENT(S)

First Exemplary Embodiment

A first exemplary embodiment of the invention will be described below with reference to the attached drawings.

Figure 1:
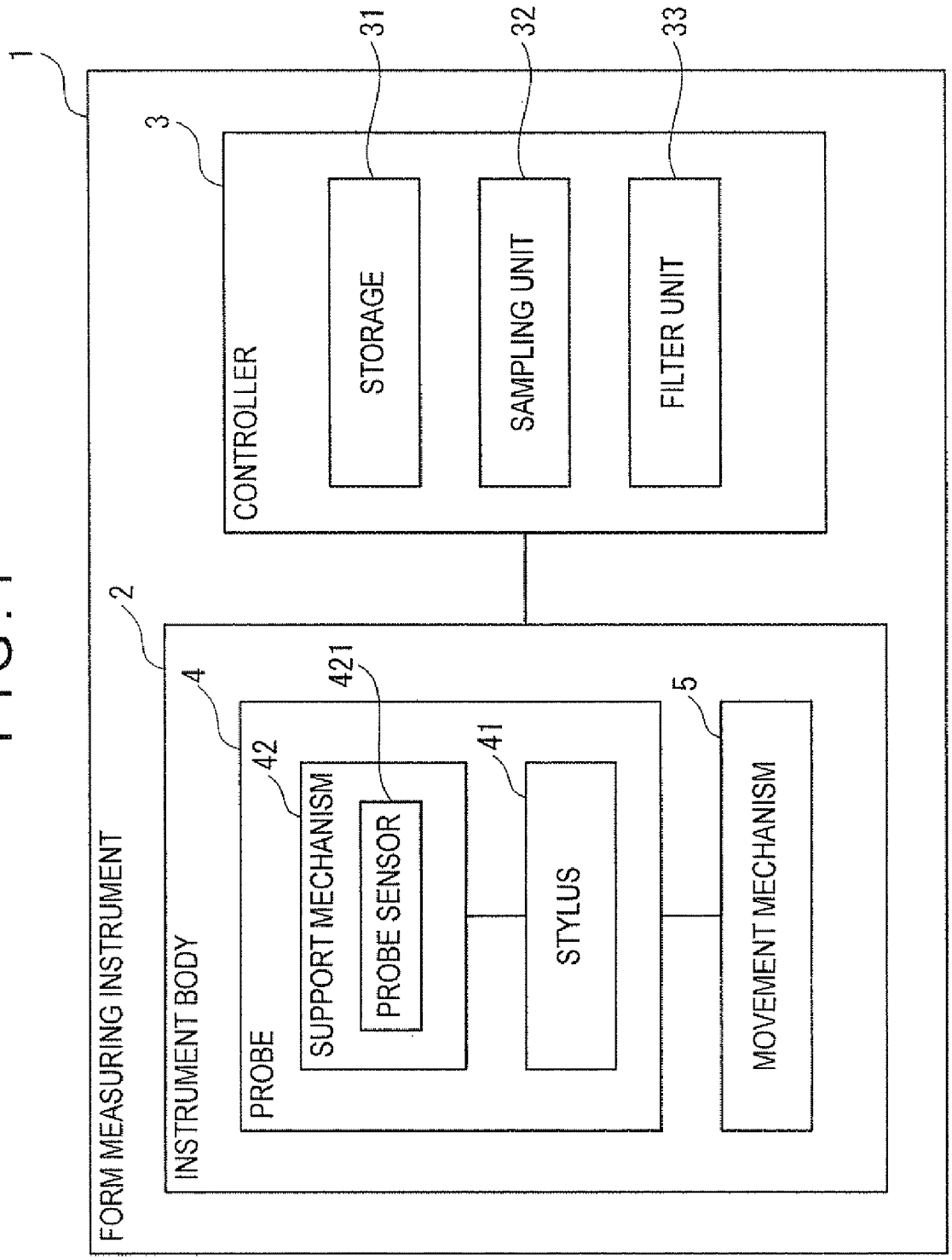
FIG. 1 is a block diagram showing a form measuring instrument according to a first exemplary embodiment of the invention.

FIG. 1 is a block diagram showing a form measuring instrument 1 according to the first exemplary embodiment of the invention.

As shown in FIG. 1, the form measuring instrument 1 includes an instrument body 2 and a controller 3 that controls the instrument body 2.

The instrument body 2 includes a probe 4 and a movement mechanism 5 for moving the probe 4 along a predetermined axial direction.

Figure 2:
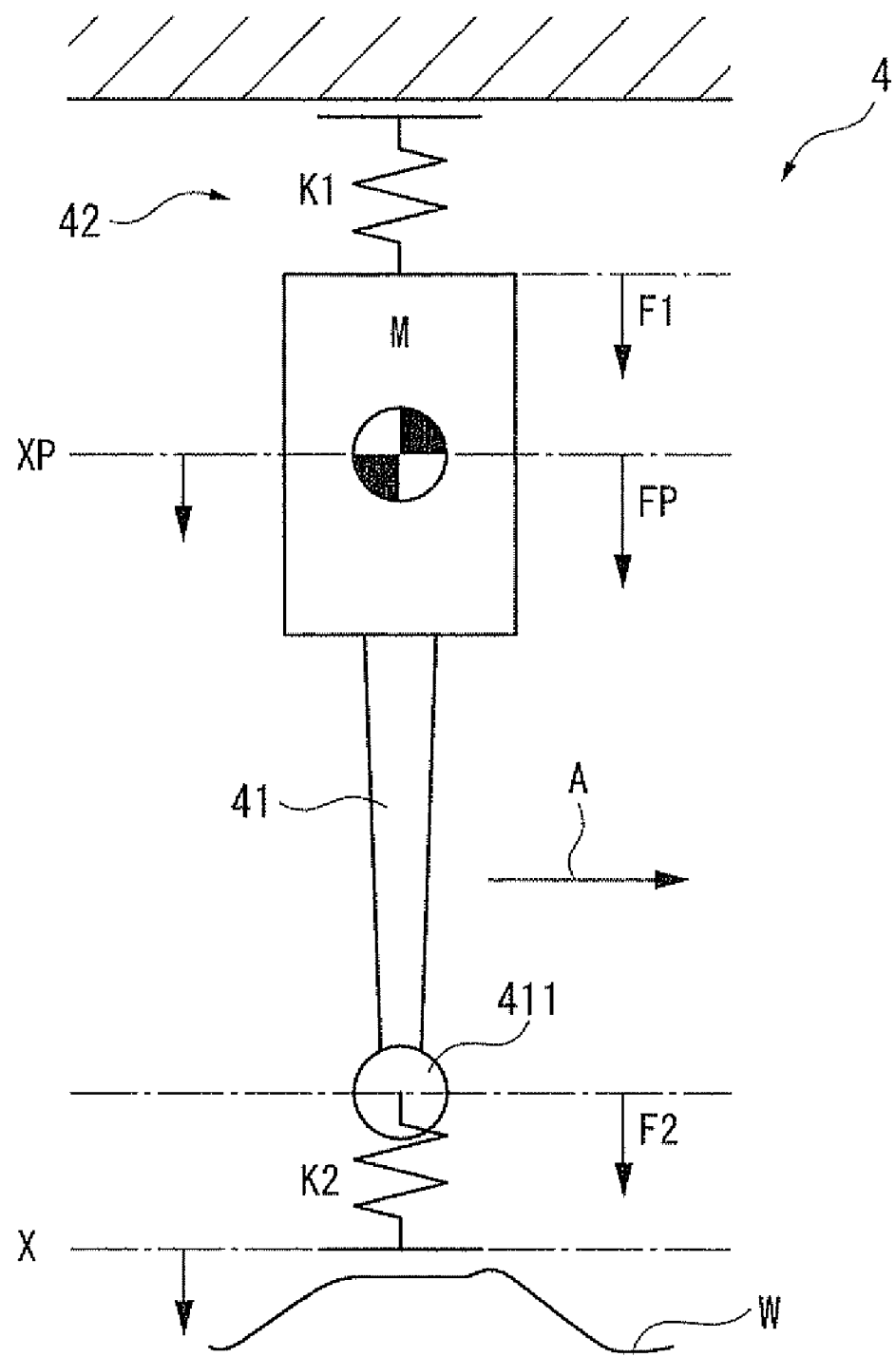
FIG. 2 is an illustration showing a motion model of a probe according to the first exemplary embodiment of the invention.

FIG. 2 shows a motion model of the probe 4. In FIG. 2, the up-and-down direction on the sheet is defined as X-axis direction for the description.

As shown in FIGS. 1 and 2, the probe 4 is provided with a rod-like stylus 41 having a distal end attached with a stylus tip 411 for contacting with an object W and a support mechanism 42 that supports the base end of the stylus 41.

The support mechanism 42 biases the stylus 41 in X-axis direction to support the stylus 41. The supported stylus 41 is positioned at a predetermined position while being movable along X-axis direction within a certain range when an external force is applied, e.g., the stylus tip 411 comes into contact with the object W. The support mechanism 42 includes a probe sensor 421 serving as a detector for detecting the X-axial position of the stylus 41 (i.e., the X-axial position of the probe 4).

The form measuring instrument 1 measures the profile of the object W by moving the probe 4 along the surface of the object W in a predetermined axial direction (e.g., an arrow A direction in FIG. 2) with the assistance of the movement mechanism 5 with the stylus tip 411 being pressed against the object W.

As shown in FIG. 1, the controller 3 serving as a measurement value calculator includes a storage 31 that stores information used by the controller 3, a sampling unit 32, and a filter unit 33.

The sampling unit 32 acquires digital data regarding the position of the stylus 41 by sampling the position of the stylus 41 detected by the probe sensor 421 and stores the digital data in the storage 31.

The filter unit 33 calculates a measurement value by applying a digital filter based on a transfer function G1 whose input is the position of the probe 4 and output is the contact position of the stylus tip 411 against the object W to the digital data stored in the storage 31.

The transfer function G1 can be derived based on, for instance, a motion model of the probe 4.

Specifically, as shown in FIG. 2, when: XP denotes the position of the stylus 41 detected by the probe sensor 421; X denotes the contact position of the stylus tip 411 against the object W (i.e., a measurement value); M denotes the mass of the probe 4; K1 denotes the spring constant of the support mechanism 42; and K2 denotes the contact spring constant between the stylus tip 411 and the object W, a force F1 acting on the support mechanism 42, a force F2 acting on the stylus tip 411, and a force FP acting on the stylus 41 are represented by the following formulae (1) to (3), respectively. In the formula (3), a prime symbol denotes time differentiation. This also applies to the below-described formula.

$$F1 = -K1 \cdot XP \quad (1)$$

$$F2 = K2 \cdot (X - XP) \quad (2)$$

$$FP = M \cdot XP'' = F2 - F1 \quad (3)$$

According to Hertzian elastic contact theory, the contact spring constant K2 between the stylus tip 411 and the object W is calculated from measurement conditions such as the physics of the object W, a load applied to the object W, the radius of the object W, and the radius of the stylus tip 411.

However, as described above, the form measuring instrument 1 measures the profile of the object W by moving the stylus tip 411 along the surface of the object W with the pressed amount of the stylus tip 411 against the object W being kept constant, so that it is possible to approximate the contact spring constant K2 as a constant value.

Accordingly, the contact spring constant K2 can be measured by using a general method for measuring a spring constant. Further, the mass M of the probe 4 and the spring constant K1 of the support mechanism 42 can be measured by using general methods for measuring a mass and a spring constant, respectively.

When the above formulae (1) and (2) are substituted into the formula (3) and rearranged, the following formula (4) is derived.

$$X = M/K2 \cdot XP'' + (1 - K1/K2) \cdot XP \quad (4)$$

Further, after Laplace transform of the formula (4), the following formula (5) is derived. Thus, when the formula (5) is transformed so that the position XP of the stylus 41 is an input and the measurement value X is an output, the transfer function G1 is represented by the following formula (6).

$$X = M/K2 \cdot XP \cdot S^2 + (1 - K1/K2) \cdot XP \quad (5)$$

$$G1 = X/XP = M/K2 \cdot S^2 + (1 - K1/K2) \quad (6)$$

Figure 3:
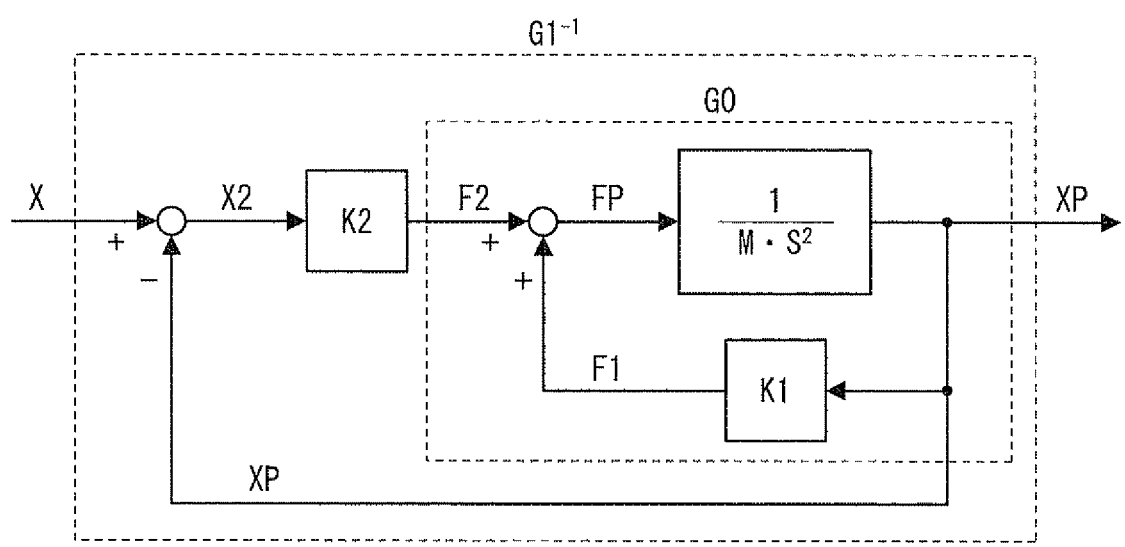
FIG. 3 is a block diagram showing the motion model of the probe according to the first exemplary embodiment of the invention.

FIG. 3 is a block diagram showing a motion model of the probe 4. Incidentally, FIG. 3 is a block diagram showing transfer function $G1^{-1}$ whose input is the measurement value X and output is the position XP of the stylus 41.

The transfer function G1 can also be derived based on, for instance, a block diagram showing a motion model of the probe 4.

Specifically, as shown in FIG. 3, when G0 denotes a transfer function whose input is the force F2 acting on the stylus tip 411 and output is the position XP of the stylus 41, the transfer function $G1^{-1}$ can be represented by the following formula (7).

$$G0 = \frac{1}{M \cdot S^2 - K1} \quad (7)$$

$$G1^{-1} = \frac{K2 \cdot G0}{1 + K2 \cdot G0} = \frac{K2}{1/G0 + K2}$$

$$G1^{-1} = \frac{K2}{M \cdot S^2 - K1 + K2} = \frac{K2}{M \cdot S^2 + (K2 - K1)}$$

When the input and output of the transfer function $G1^{-1}$ are inverted, the transfer function G1 is represented by the following formula (8). Incidentally, the formula (8) is the same as the above formula (6) representing the transfer function G1.

$$G1 = \frac{M \cdot S^2 + (K2 - K1)}{K2} = 1 - \frac{K1}{K2} + \frac{M}{K2} \cdot S^2 \quad (8)$$

Thus, based on the position XP of the stylus 41 and the transfer function G1, the measurement value X can be calculated by the following formula (9).

$$X = G1 \cdot XP = \left(1 - \frac{K1}{K2} + \frac{M}{K2} \cdot S^2\right) \cdot XP \quad (9)$$

Figure 4:
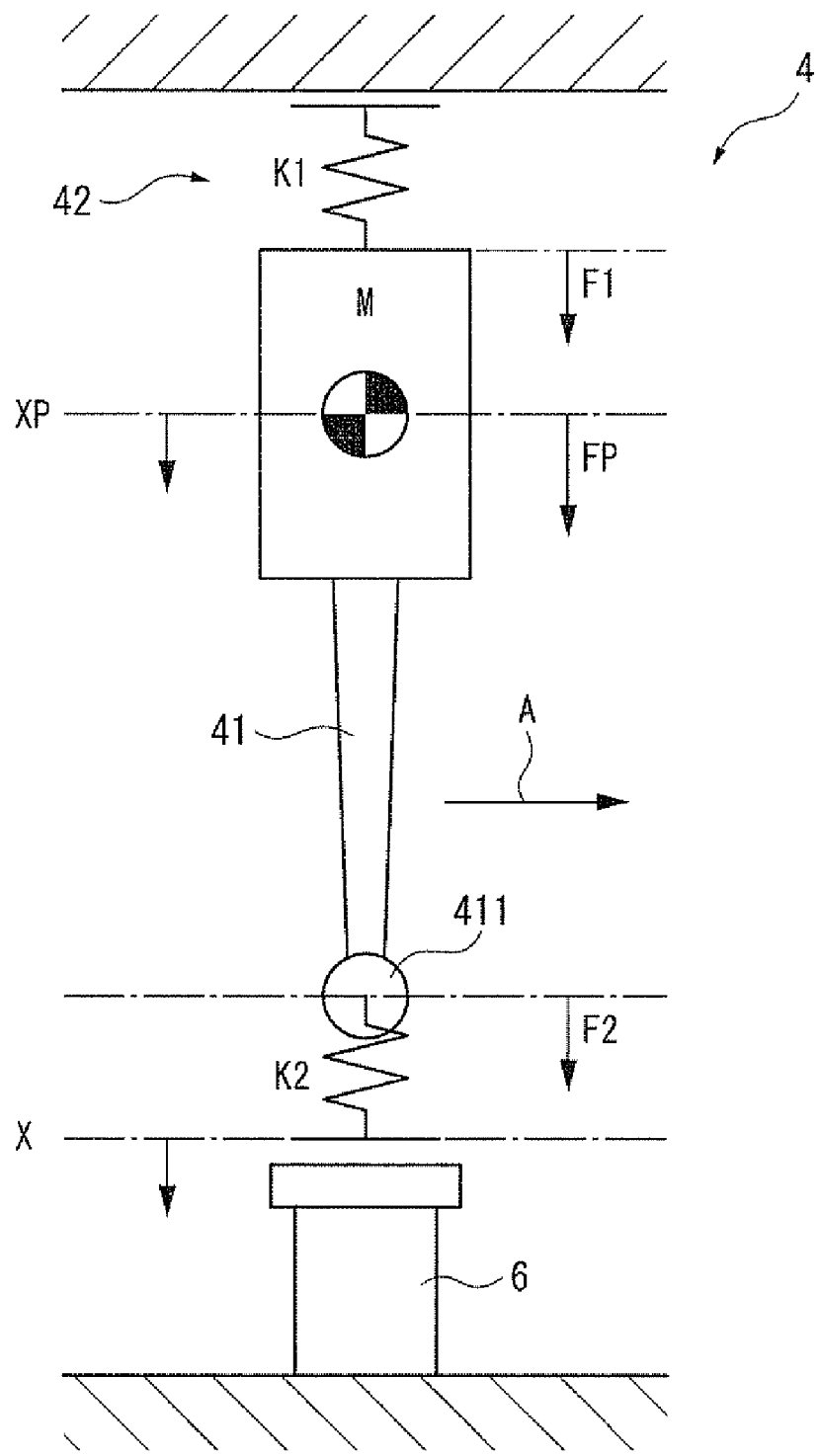
FIG. 4 is an illustration showing a state where a displacement device according to the first exemplary embodiment of the invention is used to obtain a transfer function.

FIG. 4 shows a state where a displacement device 6 is used to obtain the transfer function G1.

As shown in FIG. 4, the displacement device 6 is located near the distal end of the stylus tip 411 and is driven along X-axis direction. The displacement device 6 is brought into contact with the stylus tip 411 to cause displacement of the stylus tip 411.

The transfer function $G1^{-1}$ can also be obtained by, for instance, causing displacement of the measurement value X by using the displacement device 6 to detect the position XP of the stylus 41 and performing system identification. Based on the transfer function $G1^{-1}$, the transfer function G1 can be obtained.

The controller 3 compensates a measurement error E due to first- or higher-order term in the transfer function G1, i.e., a measurement error E based on the motion history of the probe 4. Specifically, according to this exemplary embodiment, the measurement error E can be represented by the following formula (10) based on the formulae (6) and (8).

$$E = \frac{M}{K2} \cdot S^2 \cdot XP \tag{10}$$

This exemplary embodiment provides the following advantages.

(1) The form measuring instrument 1 includes the controller 3 that calculates the measurement value X based on the transfer function G1 whose input is the position XP of the probe 4 and output is the contact position of the stylus tip 411 against the object W, so that it is possible to compensate the measurement error E due to first- or higher-order term in the transfer function G1 used by the controller 3. Thus, the measurement error E based on the motion history of the probe 4 can be compensated to improve measurement accuracy.

(2) The form measuring instrument 1 includes the sampling unit 32 and the filter unit 33. Thus, without any additional hardware for providing the transfer function G1, the form measuring instrument 1 can compensate the measurement error E based on the motion history of the probe 4 with a simple arrangement to improve measurement accuracy.

Second Exemplary Embodiment

A second exemplary embodiment of the invention will be described below with reference to the attached drawings. The components that have been described above will be denoted by the same reference numerals and the description thereof will be omitted in the following description.

FIG. 5 is a block diagram showing a form measuring instrument 1A according to the second exemplary embodiment of the invention.

According to the first exemplary embodiment, the form measuring instrument 1 includes the probe 4 and the support mechanism 42 that supports the stylus 41 in a manner movable along X-axis direction within a certain range.

In contrast, according to this exemplary embodiment, as shown in FIG. 5, the form measuring instrument 1A includes a probe 4A and a support mechanism 42A that supports the stylus 41 in a manner movable in a plurality of axial directions within a certain range.

The support mechanism 42A biases the stylus 41 in the axial direction of X axis as well as in the axial directions of Y and Z axes orthogonal to X axis to support the stylus 41. The supported stylus 41 is positioned at a predetermined position while being movable along each of X-, Y- and Z-axis directions within a certain range when an external force is applied. The support mechanism 42A includes three probe sensors 421A serving as a detector for detecting the X-, Y- and Z-axial positions of the stylus 41 (i.e., the probe 4A).

According to the first exemplary embodiment, the form measuring instrument 1 includes the filter unit 33 that calculates the measurement value by applying the digital filter based on the transfer function G1 whose input is the position of the probe 4 and output is the contact position of the stylus tip 411 against the object W.

In contrast, according to this exemplary embodiment, the form measuring instrument 1A includes a filter unit 33A that calculates a measurement value related to one of the axial directions by summing up the outputted values of transfer functions into which the positions of the probe 4A in the axial directions are respectively inputted and from which the contact position of the stylus tip 411 against the object W in the one of the axial directions is outputted.

Specifically, as shown in the following formula (II), the filter unit 33A calculates the measurement value X related to X-axis direction by summing up the outputted values of transfer functions G11, G12 and G13 into which positions XP, YP and ZP are respectively inputted and from which the contact position of the stylus tip 411 against the object W in X-axis direction is outputted. Incidentally, as shown in the following formula (II), measurement values Y and Z related to Y- and Z-axis directions are calculated by the filter unit 33A in the same manner as the measurement value X related to X-axis direction.

$$\begin{pmatrix} X \\ Y \\ Z \end{pmatrix} = \begin{pmatrix} G11 & G12 & G13 \\ G21 & G22 & G23 \\ G31 & G32 & G33 \end{pmatrix} \begin{pmatrix} XP \\ YP \\ ZP \end{pmatrix} \tag{11}$$

This exemplary embodiment provides the following advantages in addition to the same advantages as those of the first exemplary embodiment.

(3) In order to calculate a measurement value related to one of the axial directions, the filter unit 33A sums up the outputted values of the transfer functions into which the positions of the probe in the axial directions are respectively inputted and from which the contact position of the stylus tip against the object in the one of the axial directions is outputted. Thus, the measurement error E based on the motion history of the probe 4A can be compensated in consideration of interference between the axial directions. Thus, measurement accuracy can be further improved.

Modifications

It should be appreciated that the scope of the invention is not limited to the above exemplary embodiments but modifications and improvements that are compatible with an object of the invention are included within the scope of the invention.

For instance, according to the exemplary embodiments, although the controller 3 includes the storage 31, the storage may be omitted. However, since using a storage, which functions as a buffer, allows high-speed sampling and time-consuming digital filter application to be independently performed, the arrangements of the exemplary embodiments may preferably include a storage.

According to the exemplary embodiments, although the measurement value calculator is provided by the sampling unit 32 and the filter unit 33, 33A, the measurement value calculator may be provided by using an analog circuit or the like. In other words, it is only necessary for the measurement value calculator to calculate a measurement value based on a transfer function into which the position of the probe detected by the detector is inputted and from which the contact position of the stylus tip against the object is outputted.

According to the second exemplary embodiment, the filter unit 33A calculates a measurement value related to one of the axial direction by summing up the outputted values of transfer functions into which the positions of the probe 4A in the axial directions are respectively inputted and from which the contact position of the stylus tip 411 against the object W in the one of the axial directions is outputted. However, the filter unit may independently calculate the respective measurement values related to the axial directions without considering interference between the axial directions. In other words, it is only necessary for the measurement value calculator to calculate a measurement value based on a transfer function into which the position of the probe detected by the detector is inputted and from which the contact position of the stylus tip against the object is outputted.

What is claimed is:

1. A form measuring instrument comprising:
    a probe that is movable within a predetermined range and is provided with a stylus tip for contacting with an object, the stylus tip being brought into contact with the object to measure a profile of the object;
    a detector that detects a position of the probe; and
    a measurement value calculator that calculates a measurement value based on a transfer function whose input is the position of the probe detected by the detector and output is a contact position of the stylus tip against the object.

2. The form measuring instrument according to claim 1, wherein
    the measurement value calculator comprises:
    a sampling unit that samples the position of the probe detected by the detector; and
    a filter unit that calculates the measurement value by applying a digital filter based on the transfer function to the position of the probe sampled by the sampling unit.

3. The form measuring instrument according to claim 1, wherein
    the probe is movable in a plurality of axial directions,
    the transfer function includes a plurality of transfer functions into which positions of the probe in the axial directions are respectively inputted and from which the contact position of the stylus tip against the object in one of the axial directions is outputted, and
    the measurement value calculator calculates the measurement value related to the one of the axial directions by summing up outputted values of the plurality of transfer functions.

4. The form measuring instrument according to claim 2, wherein
    the probe is movable in a plurality of axial directions,
    the transfer function includes a plurality of transfer functions into which positions of the probe in the axial directions are respectively inputted and from which the contact position of the stylus tip against the object in one of the axial directions is outputted, and
    the measurement value calculator calculates the measurement value related to the one of the axial directions by summing up outputted values of the plurality of transfer functions.

* * * * *